United States Patent
Bode et al.

(10) Patent No.: US 6,734,803 B1
(45) Date of Patent: May 11, 2004

(54) LOCATING DEVICE FOR VEHICLES

(75) Inventors: Friedrich-Wilhelm Bode, Apelern (DE); Volkmar Tanneberger, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/402,723

(22) PCT Filed: Apr. 7, 1998

(86) PCT No.: PCT/DE98/00981

§ 371 (c)(1), (2), (4) Date: Oct. 8, 1999

(87) PCT Pub. No.: WO98/45724

PCT Pub. Date: Oct. 15, 1998

(30) Foreign Application Priority Data

Apr. 9, 1997 (DE) .......................... 197 14 600

(51) Int. Cl.⁷ ................................ G08B 5/22
(52) U.S. Cl. ............ 340/825.49; 340/990; 340/995.1; 701/213; 701/215; 342/357.06; 342/357.12
(58) Field of Search ............. 340/825.49, 825.36, 340/988, 989, 990, 995.1; 701/200, 207, 213, 214, 215, 216, 220, 221; 342/357.01, 357.03, 357.06, 357.12, 357.13, 357.14

(56) References Cited

U.S. PATENT DOCUMENTS

| | | | |
|---|---|---|---|
| 5,257,195 A | | 10/1993 | Hirata |
| 5,524,081 A | * | 6/1996 | Paul ........................... 701/213 |
| 5,528,248 A | * | 6/1996 | Steiner et al. ......... 342/357.06 |
| 5,577,942 A | * | 11/1996 | Juselis ............................. 367/4 |
| 5,702,070 A | * | 12/1997 | Waid ............................ 244/183 |
| 5,952,961 A | * | 9/1999 | Denninger ............. 342/357.02 |
| 6,013,007 A | * | 1/2000 | Root et al. ...................... 482/8 |
| 6,084,542 A | * | 7/2000 | Wright et al. .......... 342/357.06 |
| 6,091,359 A | * | 7/2000 | Geier ..................... 342/357.14 |
| 6,169,497 B1 | * | 1/2001 | Robert ........................ 340/988 |
| 6,249,246 B1 | * | 6/2001 | Bode et al. ............ 342/357.14 |
| 6,313,761 B1 | * | 11/2001 | Shinada ...................... 340/995 |

FOREIGN PATENT DOCUMENTS

| | | |
|---|---|---|
| DE | 42 04 164 | 8/1993 |
| DE | 196 48 145 | 5/1998 |
| EP | 0 735 380 | 10/1996 |
| JP | 09 049729 | 2/1997 |

\* cited by examiner

*Primary Examiner*—Nina Tong
(74) *Attorney, Agent, or Firm*—Kenyon & Kenyon

(57) ABSTRACT

A position finder for vehicles includes, connected to an antenna, a satellite receiver for receiving and evaluating transmitted signals sent by a plurality of satellites, additional sensors for detecting the movement of the vehicle, and a coupler computer, for joint evaluation of the transmitted signals sent by the satellites and of the sensor signals so that instantaneous positional data can be generated. To design less expensive position finders for vehicles, the position finder is characterized in that the additional sensors are sensors that are independent of the vehicle system and the satellite receiver, along with its antenna, the additional sensors and the coupler computer, are arranged in a separate housing having a terminal for a power supply voltage and an interface via which the positional data can be sent.

19 Claims, 2 Drawing Sheets

LOCATING DEVICE FOR VEHICLES

FIELD OF THE INVENTION

The present invention relates to a position finder for vehicles having a satellite receiver connected to an antenna for receiving and evaluating transmitted signals sent by a plurality of satellites, additional sensors for detecting the movement of the vehicle, and a coupler computer for joint evaluation of the transmitted signals sent by the satellites and of the sensor signals so that instantaneous positional data can be generated.

BACKGROUND INFORMATION

Position finders for vehicles maybe used, in particular, as part of navigation systems for land-, air- and water-based vehicles. In navigation systems for motor vehicles, an antenna for receiving transmitted signals sent by the satellites is arranged on the vehicle's exterior, and the signals received are sent to the respective receiver via shielded lines. As a general rule, the receiver is part of a navigation device in which the extensive data for navigation, e.g., maps and street information, can be queried. The instantaneous positional data allow accurate navigation information to be output based on the queriable navigation data. As a general rule, navigation information is output in the form of spoken information, as well as in the form of symbols and driving commands reproduced on a separate display.

By using additional sensors, the current position can be determined with a greater precision than is feasible via satellite navigation for civil applications. The additional sensors allow the vehicle's position within a given limited region to be determined with greater precision, if initial positioning information is provided. However, if the vehicle travels a long distance, the unavoidable errors in the output signals of the additional sensors become cumulative. Satellite navigation, which in civil applications allows positional accuracy of about 100 meters, can then be used within a given extended region to correct the position determined by the additional sensors.

The motor vehicle's wheel sensors, which are used for automatic brake control (ABS), may be used as the additional sensors.

Thus when a navigation system is used the output signals of the wheel sensors and any other sensors must be evaluated and used to define a position. The positional data generated in this way is sent to the coupler computer, along with the positional data generated based on the signals sent by the satellites, and evaluated in a complex manner so that the instantaneous position can be determined.

It is desirable to improve the precision of the positional data determined based on the satellite signals, and for this purpose differential correction data in the VHF range are transmitted and, with the help of the appropriate antenna, can be received and evaluated using an appropriate receiver.

Thus when installing a related-art navigation system, one must provide the necessary antenna/antennae, implement the accompanying receiver in a device inside the vehicle, and gather sensor signals from the vehicle system, for example, from the wheel sensors of an automatic brake control (ABS) system. This involves considerable cost, so navigation systems in vehicles are very expensive at the moment.

SUMMARY OF THE INVENTION

Based on the object, according to the present invention a position finder for vehicles of the type described above is characterized in that the additional sensors are exclusively sensors that are independent of the vehicle system, and the satellite receiver, along with its antenna, additional sensors and coupler computer, are arranged in a separate box having a power supply terminal and an interface via which positional data can be transmitted.

The position finder according to the present invention is based on a new concept in which the complete position finder for determining the instantaneous positional data is housed in a separate housing and is independent of the vehicle system in terms of positioning functionality. As a result, the position finder according to the present invention can be installed very easily, in particular, as a retrofit product. Aside from the power supply, all that is required is an interface via which the positional data can be sent from the position finder to a navigation device inside the vehicle, and via which, if necessary, data can be sent to the position finder, for example, to initialize it.

The position finder according to the present invention allow one to implement an inexpensive design in which complete positioning functionality is carried out by the position finder according to the present invention, and the instantaneous positional data that is generated is sent to a computer inside the vehicle which is supplied with navigation information and generates navigation recommendations based on the current positional data. According to the present invention, the computer inside the vehicle can be a standard computer, e.g., a laptop in a special holder that does not have to be permanently installed. Thus one can ensure that the amount of installation required within the vehicle is kept to a minimum, while the space required is also kept to a minimum.

A further advantage of the present invention is that the signals received by the antenna/antennae can be processed immediately without the need for long wires. In addition, because the satellite receiver and the additional sensors are arranged in the same housing, one can use the same processor to evaluate the given sets of raw data, so various simplifications are possible. As a result, it is unnecessary to first calculate the positional data based on satellite positioning and based on the additional sensors separately, and then couple the two sets of data. Instead, coupling can be carried out before the raw data are evaluated and turned into positional data.

In a particular advantageous embodiment of the present invention, the housing is designed so that it can be mounted on the vehicle's exterior, in particular, on the roof.

A complete device—including antenna—for evaluating differential data for satellite positioning can easily be integrated into the position finder according to the present invention.

DETAILED DESCRIPTION

Figure 1:
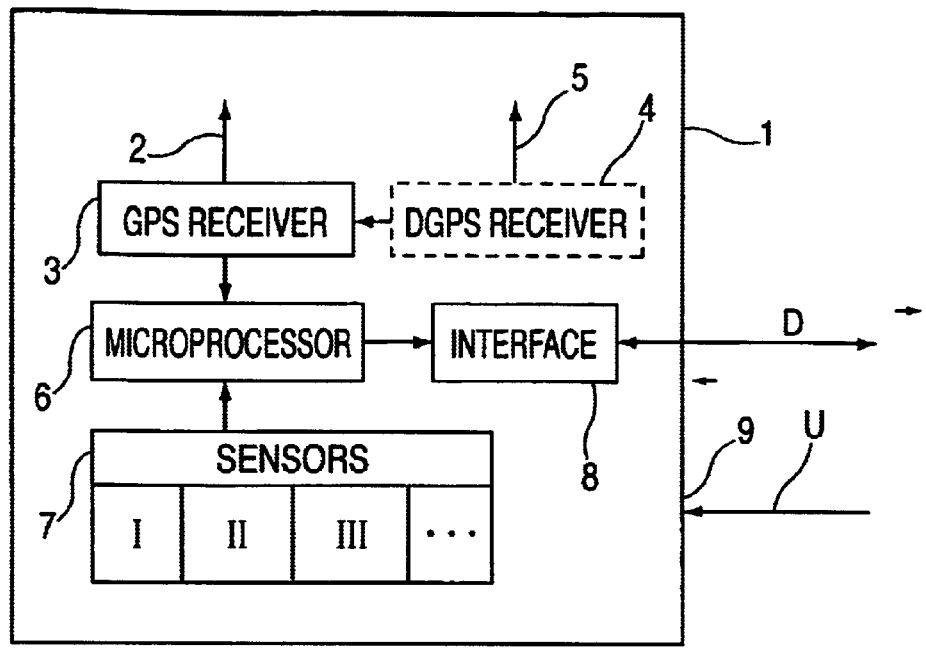
FIG. 1 is a block diagram of a first embodiment of a position finder according to the present invention.

According to FIG. 1, a Global Positioning System (GPS) antenna 2 suitable for receiving signals transmitted by GPS satellites is arranged in a separate housing 1. GPS receiver 3, in which the signals received from GPS antenna 2 are evaluated and processed so as to generate positional data, is connected to GPS antenna 2. Output signals from a Differential Global Positioning System (DGPS) receiver 4 for correcting the positional data that is generated can be sent to GPS receiver 3. DGPS receiver 4 receives its signals via DGPS antenna 5, which is used to capture DGPS signals.

The positional data generated by GPS receiver 3 are sent to microprocessor 6, to which output signals from additional sensors 7 are also sent. In FIG. 1, three sensors I, II, III are shown, which may be, for example, a gyrosensor, an accelerometer, a barometric altimeter or the like, but are in all instances independent of the motor vehicle's vehicle system.

Microprocessor 6 combines the positional data of sensors 7 and of GPS receiver 3 and serves as the coupler computer that generates the instantaneous positional data. The instantaneous positional data is sent to an interface 8, via which they can be sent to a navigation computer or the like.

Housing 1 also has a terminal 9 for power supply voltage U.

Figure 2:
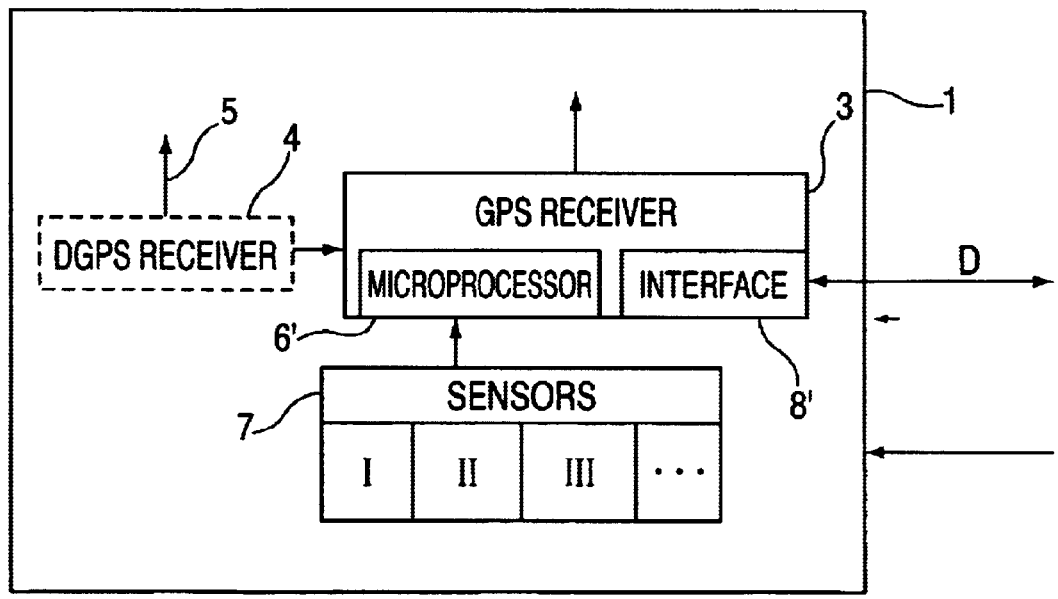
FIG. 2 is a block diagram of a second embodiment of the position finder according to the present invention.

An exemplary embodiment of the present invention shown in FIG. 2 differs from the one shown in FIG. 1 only in that the microprocessor and the interface of GPS receiver 3 can be used as microprocessor 6' and interface 8'.

Figure 3:
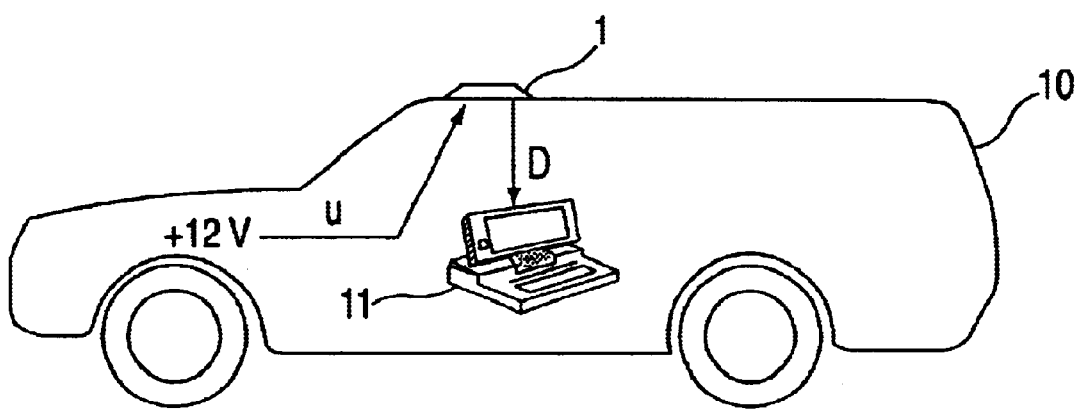
FIG. 3 illustrates the position finder according to the present invention arranged in its own housing on a roof of a motor vehicle.

FIG. 3 shows a possible arrangement of the position finder according to the present invention in a housing 1 on the roof of a motor vehicle 10. The position finder according to the present invention in housing 1 receives a power supply voltage U, for example, from the battery of the motor vehicle, and sends positional data D into the inside of the motor vehicle 10, where data D can be processed in, for example, a standard PC 11 in which navigation software and a database that is in some cases advantageous have been installed.

A laptop, for example, or alternatively a straightforward PC in a standardized housing can be used as standard PC 11.

What is claimed is:

1. A vehicle-position finder for use with a vehicle, comprising:
   a satellite receiver coupled to an antenna, the satellite receiver receiving and evaluating signals transmitted by a plurality of satellites;
   at least one sensor, the at least one sensor detecting a movement of the vehicle, the at least one sensor being independent of a vehicle system;
   a computer coupled to the satellite receiver and to the at least one sensor, the computer determining instantaneous positional data by jointly evaluating the signals transmitted by the plurality of satellites and signals generated by the at least one sensor; and
   a separate housing within which are arranged the satellite receiver, the antenna, the at least one sensor and the computer, the separate housing including a terminal and an interface via which the instantaneous positional data may be transmitted, the terminal receiving a power supply voltage;
   wherein the separate housing is designed for mounting on an exterior of the vehicle, and
   wherein the at least one sensor includes at least one of a gyrosensor and an accelerometer.

2. The vehicle-position finder according to claim 1, wherein the satellite receiver includes a global positioning satellite receiver, and the plurality of satellites include global positioning satellites.

3. The vehicle-position finder according to claim 1, further comprising:
   an additional antenna, the additional antenna receiving differential correction data for evaluating the signals transmitted by the plurality of satellites; and
   an evaluation device, the evaluation device evaluating the received differential correction data, the additional antenna and the evaluation device being integrated into the separate housing.

4. A vehicle-position finder for use with a vehicle, comprising:
   a satellite receiver coupled to an antenna, the satellite receiver receiving and evaluating signals transmitted by a plurality of satellites;
   at least one sensor, the at least one sensor detecting a movement of the vehicle, the at least one sensor being independent of a vehicle system;
   a computer coupled to the satellite receiver and to the at least one sensor, the computer determining instantaneous positional data by jointly evaluating the signals transmitted by the plurality of satellites and signals generated by the at least one sensor;
   a separate housing to house the satellite receiver, the antenna, the at least one sensor and the computer, the separate housing including a terminal and an interface via which the instantaneous position data may be transmitted, the terminal receiving a power supply voltage, the separate housing being mountable on an exterior of the vehicle;
   an additional antenna to receive differential correction data for evaluating the signals transmitted by the plurality of satellites; and
   an evaluation device to evaluate the received differential correction data, wherein the additional antenna and the evaluation device are integrated with the separate housing.

5. The vehicle-position finder of claim 4, wherein the satellite receiver is a GPS receiver.

6. The vehicle-position finder of claim 4, wherein the plurality of satellites are GPS satellites.

7. The vehicle-position finder of claim 4, wherein the differential correction data are Differential GPS data.

8. The vehicle-position finder of claim 4, wherein the satellite receiver is a GPS receiver, the plurality of satellites are GPS satellites, and the differential correction data are Differential GPS data.

9. The vehicle-position finder of claim 4, wherein the at least one sensor is at least one of a gyrosensor, an accelerometer, and a barometric altimeter.

10. The vehicle-position finder of claim 4, wherein the at least one sensor includes three sensors.

11. The vehicle-position finder of claim 4, wherein the at least one sensor includes a gyrosensor, an accelerometer, and a barometric altimeter.

12. A vehicle-position finder for use with a vehicle, comprising:
    a GPS satellite receiver coupled to an antenna;
    at least one sensor to detect a vehicle movement, the at least one sensor being independent of a vehicle system;
    a processor arrangement coupled to the satellite receiver and to the at least one sensor to determine position data by jointly evaluating GPS signals and signals generated by the at least one sensor;
    a separate housing to house the GPS satellite receiver, the antenna, the at least one sensor and the processor arrangement, and including an input arrangement by which the position data may be transmitted, and being mountable on a vehicle exterior;

another antenna to receive differential correction data for evaluating the GPS signals; and an evaluation arrangement to evaluate received differential correction data.

13. The vehicle-position finder of claim 12, wherein the another antenna and the evaluation arrangement are with the separate housing.

14. The vehicle-position finder of claim 12, wherein the plurality of satellites are GPS satellites.

15. The vehicle-position finder of claim 12, wherein the differential correction data are Differential GPS data.

16. The vehicle-position finder of claim 12, wherein the plurality of satellites are GPS satellites, and the differential correction data are Differential GPS data.

17. The vehicle-position finder of claim 12, wherein the at least one sensor is at least one of a gyrosensor, an accelerometer, and a barometric altimeter.

18. The vehicle-position finder of claim 12, wherein the at least one sensor includes three sensors.

19. The vehicle-position finder of claim 12, wherein the at least one sensor includes a gyrosensor, an accelerometer, and a barometric altimeter.

* * * * *

UNITED STATES PATENT AND TRADEMARK OFFICE
CERTIFICATE OF CORRECTION

PATENT NO. : 6,734,803 B1
DATED : May 11, 2004
INVENTOR(S) : Friedrich-Wilhelm Bode et al.

It is certified that error appears in the above-identified patent and that said Letters Patent is hereby corrected as shown below:

Column 1,
Line 15, change "finders for vehicles maybe used" to -- finders for vehicles may be used --
Line 65, insert -- An object of the present invention is to find a less expensive design of position finders for vehicles. --

Column 2,
Line 20, change "allow one to implement" to -- allows one to implement --

Signed and Sealed this

Tenth Day of May, 2005

JON W. DUDAS
*Director of the United States Patent and Trademark Office*